US008902858B2

(12) United States Patent
Liu

(10) Patent No.: US 8,902,858 B2
(45) Date of Patent: Dec. 2, 2014

(54) LOW REUSE PREAMBLE

(75) Inventor: Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 12/834,219

(22) Filed: Jul. 12, 2010

(65) Prior Publication Data
US 2011/0013531 A1 Jan. 20, 2011

Related U.S. Application Data

(60) Provisional application No. 61/225,795, filed on Jul. 15, 2009, provisional application No. 61/226,001, filed on Jul. 16, 2009.

(51) Int. Cl.
H04B 7/216 (2006.01)
H04W 48/12 (2009.01)
H04J 11/00 (2006.01)
H04W 84/04 (2009.01)
H04W 28/04 (2009.01)

(52) U.S. Cl.
CPC ............ *H04W 48/12* (2013.01); *H04W 84/045* (2013.01); *H04J 11/0069* (2013.01); *H04W 28/04* (2013.01)
USPC ........... 370/335; 370/337; 370/342; 370/344; 370/437

(58) Field of Classification Search
CPC ..... H04W 72/04; H04W 88/08; H04W 76/00; H04W 48/12; H04J 11/0069
USPC .......... 370/329, 328, 335, 337, 342, 344, 437
See application file for complete search history.

(56) References Cited

U.S. PATENT DOCUMENTS

| 8,249,029 | B2* | 8/2012 | Palanki et al. ................ 370/335 |
| 8,467,367 | B2 | 6/2013 | Malladi et al. |
| 8,559,382 | B2* | 10/2013 | Kim et al. ...................... 370/329 |
| 2005/0147024 | A1* | 7/2005 | Jung et al. ...................... 370/203 |
| 2008/0043879 | A1 | 2/2008 | Gorokhov et al. |
| 2009/0011778 | A1 | 1/2009 | Jung et al. |
| 2009/0067386 | A1* | 3/2009 | Kitazoe ......................... 370/332 |
| 2009/0129298 | A1* | 5/2009 | Luo et al. ...................... 370/280 |
| 2009/0131037 | A1* | 5/2009 | Malladi et al. ............. 455/422.1 |

(Continued)

FOREIGN PATENT DOCUMENTS

CN 101098161 A 1/2008
EP 2017978 1/2009

(Continued)

OTHER PUBLICATIONS

WO 2008/111821 A1.*

(Continued)

*Primary Examiner* — Chuong T Ho
(74) *Attorney, Agent, or Firm* — Larry Moskowitz

(57) ABSTRACT

Systems and methodologies are described that facilitate cell search and detection in high interference situations. Heterogeneous network can include a plurality of unplanned femtocell deployments, which can prevent macrocellular UEs from acquiring macrocells. A base station within the network can transmit a low reuse preamble that includes system information, wherein the low reuse preamble is tunneled on a downlink traffic channel such as a physical downlink shared channel. A UE can detect the low reuse preamble and evaluate the preamble to obtain the system information.

51 Claims, 14 Drawing Sheets

(56) References Cited

U.S. PATENT DOCUMENTS

| | | | |
|---|---|---|---|
| 2009/0176463 A1* | 7/2009 | Raaf et al. | 455/101 |
| 2009/0197588 A1 | 8/2009 | Khandekar et al. | |
| 2009/0219860 A1* | 9/2009 | Tanno et al. | 370/328 |
| 2009/0247172 A1* | 10/2009 | Palanki et al. | 455/447 |
| 2009/0310565 A1* | 12/2009 | Huo et al. | 370/331 |
| 2009/0312008 A1* | 12/2009 | Lindoff et al. | 455/423 |
| 2010/0103860 A1* | 4/2010 | Kim et al. | 370/315 |
| 2010/0172311 A1* | 7/2010 | Agrawal et al. | 370/329 |
| 2010/0278123 A1* | 11/2010 | Fong et al. | 370/329 |

FOREIGN PATENT DOCUMENTS

| | | | |
|---|---|---|---|
| EP | 2077692 | A2 | 7/2009 |
| JP | 2000324535 | A | 11/2000 |
| JP | 2004150892 | A | 5/2004 |
| JP | 2008252557 | A | 10/2008 |
| JP | 2009017559 | A | 1/2009 |
| KR | 20090077640 | A | 7/2009 |
| WO | 2007149997 | A2 | 12/2007 |
| WO | 2009014356 | A1 | 1/2009 |
| WO | 2009020983 | A1 | 2/2009 |
| WO | 2009048907 | | 4/2009 |
| WO | WO2009065075 | A1 | 5/2009 |
| WO | WO2009099813 | | 8/2009 |
| WO | WO2009120904 | | 10/2009 |

OTHER PUBLICATIONS

"3rd Generation Partnership Project; Technical Specification Group Radio Access Network; Physical Channels and Modulation (Release 8)", 3GPP Standard; 3GPP TS 36.211, 3rd Generation Partnership Project (3GPP), Mobile Competence Centre; 650, Route Deslucioles; F-06921 Sophia-Antipolis Cedex; France, No. V1.1.0, May 1, 2007, pp. 1-34, XP050377530 chapter 5.7.1, chapter 5.8, chapter 6.7.2.

"S-SCH sequence design" 3GPP Draft; R1-071027, 3rd Generation Partnership Project (3GPP), Mobile Competence Centre ; 650, Route Des Lucioles ; F-06921 Sophia-Antipolis Cedex ; France, vol. RAN WG1, no. St. Louis, USA; Feb. 12, 2007, Feb. 6, 2007, XP050105026 figures 1,2 p. 1, line 1-p. 5, line 4 p. 7, line 10-line 18.

International Search Report—PCT/US2010/042006—International Search Authority, European Patent Office, Dec. 28, 2010.

Partial International Search Report—PCT/US2010/042006—International Search Authority, European Patent Office, Oct. 26, 2010.

Written Opinion—PCT/US2010/042006—ISA/EPO—Dec. 28, 2010.

Taiwan Search Report—TW099123319—TIPO—Feb. 1, 2013.

* cited by examiner

LOW REUSE PREAMBLE

CLAIM OF PRIORITY UNDER 35 U.S.C. §119

The present application for patent claims priority to U.S. Provisional Application Ser. No. 61/225,795, filed Jul. 15, 2009, entitled "LOW REUSE PREAMBLE," and U.S. Provisional Application Ser. No. 61/226,001, filed Jul. 16, 2009, entitled "LOW REUSE PREAMBLE." The aforementioned U.S. Provisional Applications are assigned to the assignee hereof and hereby expressly incorporated by reference in their entireties.

BACKGROUND

I. Field

The following description relates generally to wireless communications systems, and more particularly to facilitating detection of cells in high interference scenarios by way of a low reuse preamble.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, etc.). Examples of such multiple-access systems may include Code Division Multiple Access (CDMA) systems, Time Division Multiple Access (TDMA) systems, Frequency Division Multiple Access (FDMA) systems, Orthogonal Frequency Division Multiple Access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells. The networks can include femtocells as well as macrocells that cover larger areas. Because the strength of a signal typically decreases as the distance over which it is communicated increases, a network user can, under various circumstances, exchange substantially strong signals with cells located physically close to the user as compared to cells that are located farther away from the user. Accordingly, a macrocellular user equipment (UE), in close proximity to a femtocell, can fail to detect, acquire, and register with a macrocell base station due to strong interference from the femtocell.

SUMMARY

In accordance with one or more embodiments and corresponding disclosure thereof, various aspects are described in connection with facilitating cell search and detection in high interference situations. Heterogeneous network can include a plurality of unplanned femtocell deployments, which can hinder macrocellular UEs from acquiring macrocells. A base station within the network can transmit a low reuse preamble that includes system information, wherein the low reuse preamble is tunneled on a downlink traffic channel such as a physical downlink shared channel. A UE can detect the low reuse preamble and evaluate the preamble to obtain the system information.

According to a first aspect, a method is described herein that can include detecting a low reuse preamble transmitted by a base station. In addition, the method can include evaluating the low reuse preamble to identify system information associated with the base station.

Another aspect relates to a wireless communications apparatus. The wireless communications apparatus can include a memory that retains instructions related to identifying a low reuse preamble transmitted by a base station and evaluating the low reuse preamble to identify system information associated with the base station. The wireless communications apparatus can further include a processor, coupled to the memory, configured to execute the instructions retained in the memory.

Yet another aspect relates to an apparatus that enables detection of a base station in high-interference environments. The apparatus can include means for detecting a low reuse preamble transmitted by the base station. The apparatus can also include means for analyzing the low reuse preamble to obtain system information associated with the base station.

Still another aspect relates to a computer program product that can comprise a computer-readable medium. The computer-readable medium can include code for causing at least one computer to detect a low reuse preamble transmitted by a base station. In addition, the computer-readable medium can include code for causing the at least one computer to evaluate the low reuse preamble to identify system information associated with the base station.

In accordance with another aspect, a wireless communications apparatus is described. The wireless communications apparatus can include a processor configured to identify a low reuse preamble transmitted by a base station, wherein the low reuse preamble is transmitted in a traffic channel portion of a sub-frame. The processor can further be configured to evaluate the low reuse preamble to identify system information associated with the base station.

According to other aspects, a method is described that can include generating a low reuse preamble that includes system information associated with a base station. The method can also include incorporating the low reuse preamble into a traffic channel portion of a sub-frame. In addition, the method can include transmitting the low reuse preamble to at least one mobile device.

Another aspect relates to a wireless communications apparatus comprising a memory. The memory retains instructions related to generating a low reuse preamble that includes system information associated with a base station, wherein the low reuse preamble includes at least one of a synchronization signal, a broadcast channel, or a reference signal, and incorporating the low reuse preamble into a traffic channel portion of a sub-frame. The memory further retains instructions related to transmitting the low reuse preamble to at least one mobile device. The wireless communications apparatus can also include a processor, coupled to the memory, configured to execute the instructions retained in the memory.

Yet another aspect relates to an apparatus that can include means for generating a low reuse preamble that includes system information associated with a base station, wherein the low reuse preamble includes at least one of a synchronization signal, a broadcast channel, or a reference signal. The apparatus can also include means for incorporating the low reuse preamble into a traffic channel portion of a sub-frame. In addition, the apparatus can include means for transmitting the low reuse preamble to at least one mobile device.

Still another aspect relates to a computer program product that can comprise a computer-readable medium. The computer-readable medium can include code for causing at least one computer to generate a low reuse preamble that includes system information associated with a base station, wherein the low reuse preamble includes at least one of a synchronization signal, a broadcast channel, or a reference signal. The computer-readable medium can also include code for causing the at least one computer to identify control signaling and common reference signal symbols in a sub-frame. Further, the computer-readable medium can include code for causing the at least one computer to incorporate the low reuse preamble into a traffic channel of the sub-frame in a non-overlapping manner relative to the control signaling and common reference signal symbols. In addition, the computer-readable medium can include code for causing the at least one computer to transmit the low reuse preamble to at least one mobile device.

In accordance with another aspect, a wireless communications apparatus is described. The apparatus can include a processor configured to generate a low reuse preamble that includes system information associated with a base station, wherein the low reuse preamble includes at least one of a synchronization signal, a broadcast channel, or a reference signal, identify control signaling and common reference signal symbols in a sub-frame, incorporate the low reuse preamble into a traffic channel of the sub-frame in a non-overlapping manner relative to the control signaling and common reference signal symbols, and transmit the low reuse preamble to at least one mobile device.

DETAILED DESCRIPTION

Figure 1:
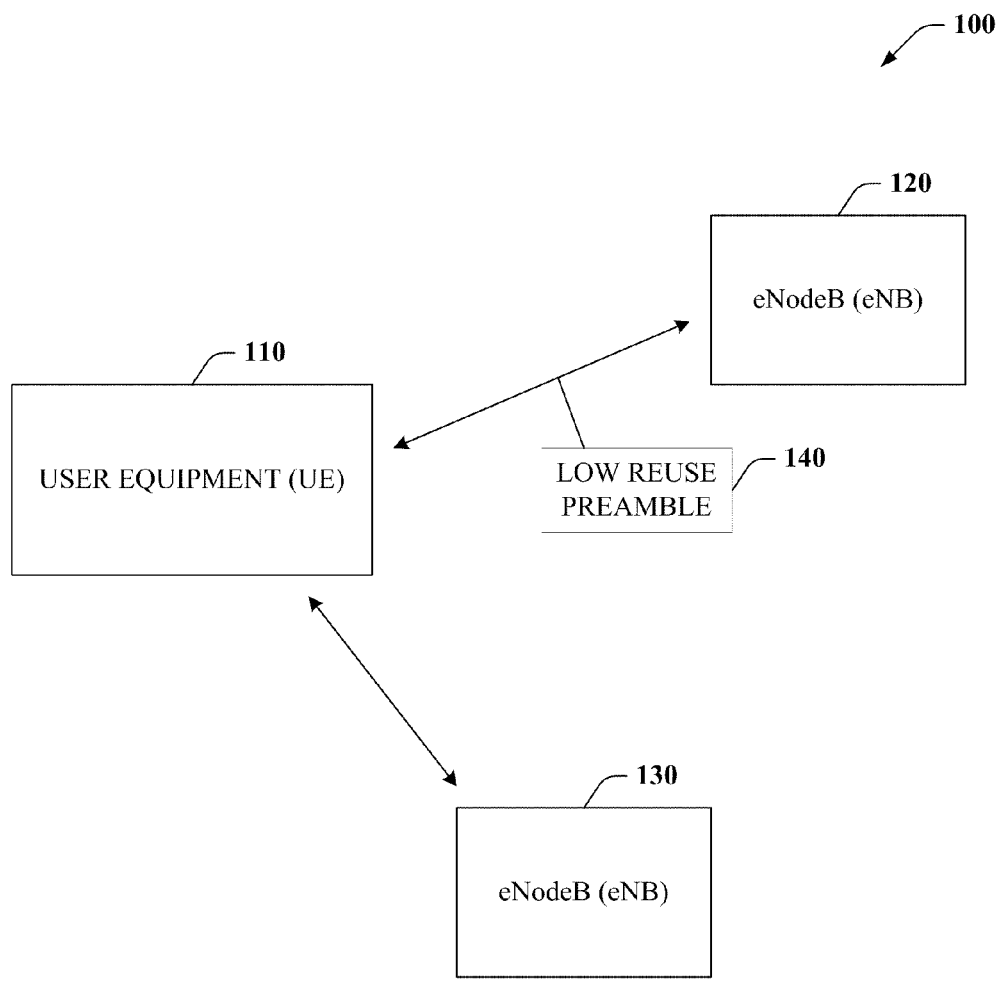
FIG. 1 illustrates an example wireless communication system that facilitates detecting base station via a low reuse preamble in high-interference situations in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release, e.g., Release 8, that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc., discussed in connection with the figures. A combination of these approaches can also be used.

Referring now to the drawings, FIG. 1 illustrates an example wireless communication system 100 that facilitates detecting base station via a low reuse preamble in high-interference situations in accordance with various aspects. Wireless communication system 100 includes a first base station or eNodeB (eNB) 120, a second base station or eNB 130, and user equipment (UE) 110. eNB 120 and UE 110 can communicate with one another over a wireless link. For instance, eNB 120 can transmit information to UE 120 over a downlink channel and UE 110 can transmit information to eNB 120 over an uplink channel. Similarly, UE 110 can also communicate with eNB 130 via respective uplink and/or downlink channels. While, to facilitate explanation, only two eNBs (e.g., eNBs 120 and 130) and one UE 110 are illustrated in FIG. 1, it should be appreciated that system 100 can include any number of UEs and/or eNBs. In addition, eNBs 120 and 130 can be referred to as a base station, access point, an eNodeB, an evolved NodeB, a NodeB, etc. UE 110 can be referred to as a mobile device, a mobile terminal, a mobile station, a station, a wireless terminal, or the like. Further, it should be appreciated that system 100 can operate in a 3GPP LTE or LTE-A wireless network, an WCDMA wireless network, an OFDMA wireless network, a CDMA network, a 3GPP2 CDMA2000 network, an EV-DO network, a WiMAX network, a HSPA network, etc. While aspects described below are explained with respect to a LTE network and/or LTE radio access technology, it is to be appreciated that techniques described herein can be utilized within the above networks as well as in other wireless networks and/or radio access technologies.

In an aspect, eNBs 120 and 130 can provide wireless communication coverage for respective geographic areas. The geographic area covered can be denoted a cell of eNB 120 or eNB 130. According to an example, eNB 120 can be associated with a macrocell, which covers a relatively large geographic area. eNB 120, can allow unrestricted access to UEs. UE 110, in an example, can be macrocellular UE configured to access a communication network via eNB 120, which is associated with a macrocell. Typically, UE 110 can perform a cell search to detect eNB 120. During a cell search, UE 110 can acquire frequency and symbol synchronization with a cell, such as a cell served by eNB 120, acquire frame timing of the cell, and ascertain a physical-layer cell identity associated with the cell. In an aspect, LTE supports 504 distinct physical-layer cell identities, wherein this set of cell identities is further divided into 168 cell-identity groups that include three cell identities each.

To facilitate cell search, eNB 120 can transmit a primary synchronization signal (PSS) and a secondary synchronization signal (SSS). The PSS, in an aspect, can be a length—63 Zadoff-Chu sequence extended with five zeros at the edges and mapped to a center 73 sub-carriers of the downlink. The PSS can take one of three different values, wherein each value specifies a cell identity within a cell identity group. After detecting the PSS, UE 110 can determine slot timing (e.g., 5 ms timing) of the cell and the cell identity within the cell identity group associated with eNB 120. After PSS detection, UE 110 can detect the SSS transmitted by eNB 120. The SSS, in an aspect, can be two length—31 M-sequences interleaved together. The SSS can take one of 168 different values, wherein each value specifies a cell-identity group. After detecting the SSS, UE 110 can determine the radio frame timing, the physical-layer cell identity associated with eNB 120, cyclic prefix length, and whether frequency division duplex (FDD) or time division duplex (TDD) is employed. After SSS detection, UE 110 can proceed to decode system information broadcasted on a physical broadcast channel (PBCH). In particular, the system information on PBCH can include a master information block which conveys bandwidth information, PHICH configuration information, and/or a system frame number. Subsequently, UE 110 can initiate random access procedures.

In an example, eNB 130 can be associated with a femtocell, which covers a relatively small geographic area (e.g., a home, an office, a building, etc.) and provides restricted access. For instance, eNB 130 allows access by UEs included in a closed subscriber group (CSG). In accordance with the example, UE 110 can be excluded from the CSG. While in proximity to eNB 130 (e.g., within a supported coverage area), UE 110 can experience interference from transmissions (e.g., broadcasts, synchronization signals, pilot signals, etc.) of eNB 130. Such interference can reach levels high enough to preclude UE 110 from detecting and acquiring eNB 120 as described above. When eNB 130 and eNB 120 are included within the same operator network, which is also a synchronized network, high interference situations due to deployment of femtocells, such as eNB 130, can lead to more frequent coverage blackouts.

In heterogeneous networks (e.g., networks including base stations with different power classes (macrocells, femtocells, picocells, etc.)), deployments of femtocells or Home NodeBs (HNBs) are typically unplanned by an operator. Accordingly, high-interference areas can randomly spawn within a larger macrocell. To reduce impact of femtocell deployments on macrocellular UEs, eNB 120 can periodically transmit a low reuse preamble 140. Low reuse preamble 140 can include identity information and/or system information, which facilitates detection of eNB 120 by UE 110. In addition, low reuse preamble 140 can include a pilot or reference signal to facilitate coherent demodulation and decode of the preamble. In one aspect, low reuse preamble 140 can be transmitted such that there is a relatively large period between successive transmissions. For example, eNB 120 can transmit low reuse preamble 140 every 100 milliseconds. However, it is to be appreciated that other transmission period lengths can be utilized and that the transmission period can be configured by an operator and/or dynamically tuned by system 100 based upon interference measurements, system loading, etc.

As an alternative to detecting a PSS/SSS transmission by eNB 120, UE 110 can detect and decode low reuse preamble 140. For example, the PSS/SSS transmission of eNB 120 can be blocked by high interference from eNB 130. However, eNB 120 utilizes different resources to transmit low reuse preamble 140 and, accordingly, UE 110 can detect the preamble despite the high interference environment.

Figure 2:
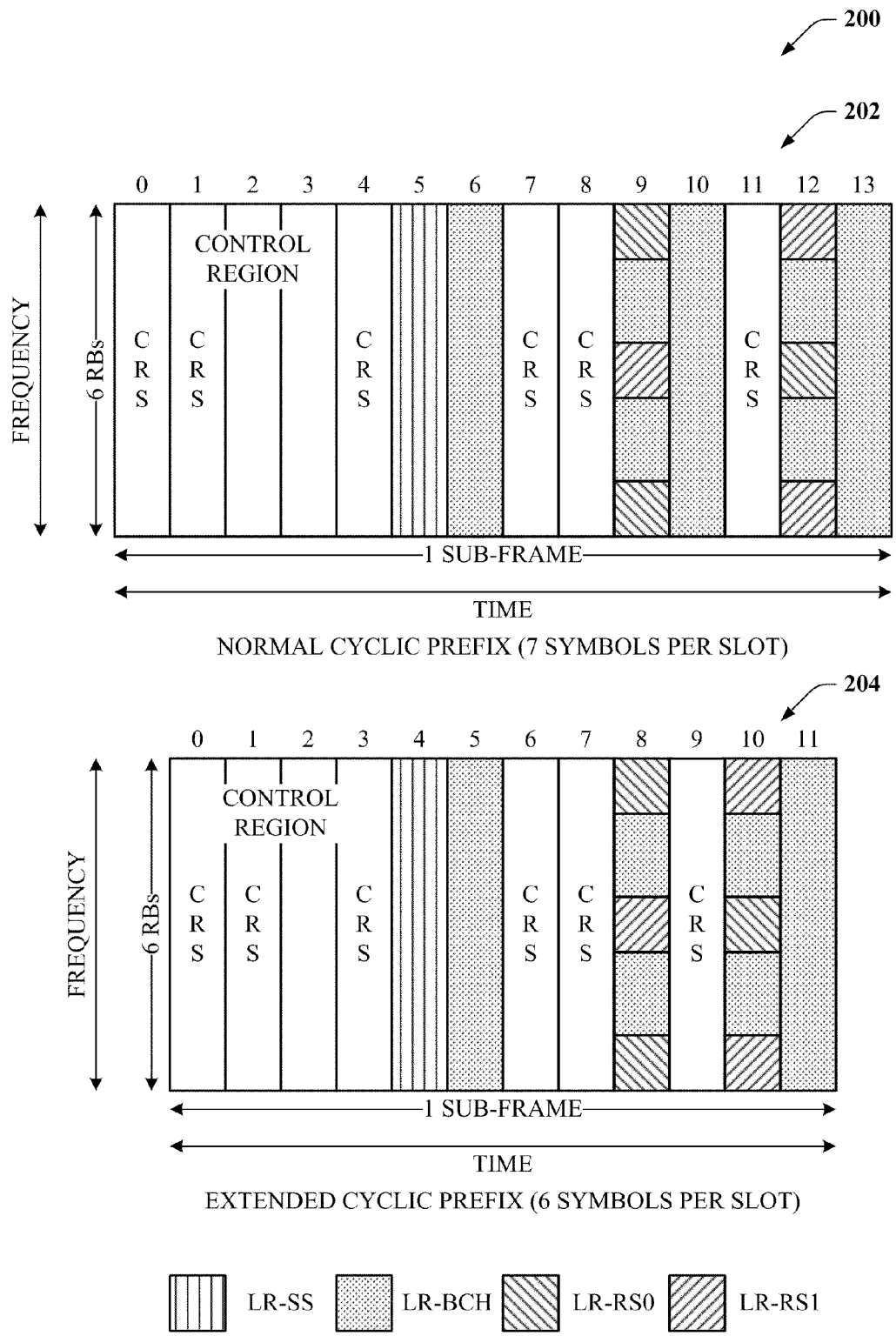
FIG. 2 is an illustration of an example resource diagram for a low reuse preamble in accordance with various aspects.

Turning to FIG. 2, a resource diagram 200 is illustrated that depicts an example low reuse preamble. Resource diagram 200 depicts a low reuse preamble structure 202 that can be utilized with a normal cyclic prefix which includes 7 symbols per slot (14 per sub-frame) and a low reuse preamble structure 204 that can be employed with an extended cyclic prefix which includes 6 symbols per slot (12 per sub-frame). Accordingly to an example, structures 202 and 204 can span 6 resource blocks (RBs) in the frequency dimension and one sub-frame (two slots) in the time dimensions. It is to be appreciated that claimed subject matter is not limited to the example structures 202 and 204 illustrated in FIG. 2 as it is contemplated that alternative structures, with varying sizes in the frequency and/or time dimension, are intended to fall within the scope of the hereto appended claims.

As shown in FIG. 2, the low reuse preamble can include a plurality of sub-channels, such as, but not limited to a synchronization signal (e.g., low reuse synchronization signal (LR-SS)), a broadcast channel (e.g., low reuse broadcast channel (LR-BCH)), and/or a reference signal (e.g., low reuse reference signal (LR-RS)). In an aspect, the sub-channels are placed within a sub-frame, such that common reference signals (CRS) and the control region are avoided. In an aspect, the control region of a sub-frame can span 1, 2, or 3 symbols in the first slot for large system bandwidths, and up to 5 symbols in the first slot for small system bandwidths. Typically, the control region symbols are the first symbols of a sub-frame.

Common reference signals (also referred to as cell-specific reference signals) facilitate generation of channel estimates by a UE. An arrangement of common reference signal symbols can depend upon a number of antenna ports configured for a base station. For instance, each antenna port can have a respective common reference signal which occupies unique resource elements of a resource block. In one example, common reference signal symbols, for four antenna ports, can occupy one or more resource elements of OFDM symbols as shown in structures 202 and 204. To avoid CRS and control signaling, the low reuse preamble can occupy symbols 5, 6, 9, 10, 12, and 13 of a sub-frame for normal cyclic prefix and symbols 4, 5, 8, 10, and 11 for extended cyclic prefix. In particular, LR-SS can occupy symbol 5 (normal cyclic prefix) or symbol 4 (extended cyclic prefix), LR-BCH can utilize symbols 6, 9, 10, 12, and 13 (normal cyclic prefix) or symbols 5, 8, 10, and 11 (extended cyclic prefix), and LR-RS can be incorporated into symbols 9 and 12 for normal cyclic prefix or symbols 8 and 10 for extended cyclic prefix.

In an aspect, LR-SS enables fast detection of the low reuse preamble through synchronization signal detection as described above. In addition, LR-SS facilitates scrambling and/or randomizing LR-BCH or LR-RS to reduce low reuse preamble detection error. For example, LR-SS can facilitate LR-RS position shifting and scrambling. In another example, LR-SS can facilitate LR-BCH scrambling and cyclic redundancy check (CRC) masking. To further facilitate cell search, LR-SS can convey at least a portion of identity information. For instance, LR-SS can include a partial cell identity (e.g., a cell identity group or identity within a group) or LR-SS can include a complete cell identity.

According to an aspect, LR-SS can utilize PSS/SSS design of LTE Release-8. For example, LR-SS can include a length—63 Zadoff-Chu sequence and/or two length—31 M-sequences concatenated together. In another aspect, LR-SS can employ an optimized sequence which provides good cross-correlation properties.

LR-RS can employ LTE Release-8 common reference signal (RS) design. For instance, two interlaces (e.g., LR-RS0 and LR-RS1) can be utilized to support 2 transmit antennas. Position shifting and/or scrambling can be based upon an LR-SS sequence. In another example, scrambling can be based upon an interlace and/or RS position index. In another aspect, LR-RS can employ LTE Release-8 dedicated or UE-specific reference signal design. In yet another aspect, LR-RS can utilize a generic RS sequence and placement. For example, a predetermined sequence and/or resource element locations can be utilized to generate LR-RS. The predetermined sequence can be a sequence with good cross-correlation properties to facilitate fast preamble detection via LR-RS.

Similar to LR-RS and LR-SS, LR-BCH can utilize PBCH design from LTE Release-8. In one aspect, LR-BCH can support space-frequency block coding (SFBC) diversity. A UE can perform a blind decode of an SFBC transmission or non-SFBC transmission to determine whether diversity is employed. In addition, a CRC masking applied to LR-BCH can include diversity information. In another aspect, LR-BCH can utilize QPSK modulation and tail-biting convolutional coding.

In another example, the low reuse preamble can conform to LTE Release-8 slot boundaries, such that a first two symbols of the low reuse preamble are in a first slot and remaining symbols are in a second slot. Intra sub-frame hopping can be utilized such that each slot hops in different frequency locations.

Figure 3:
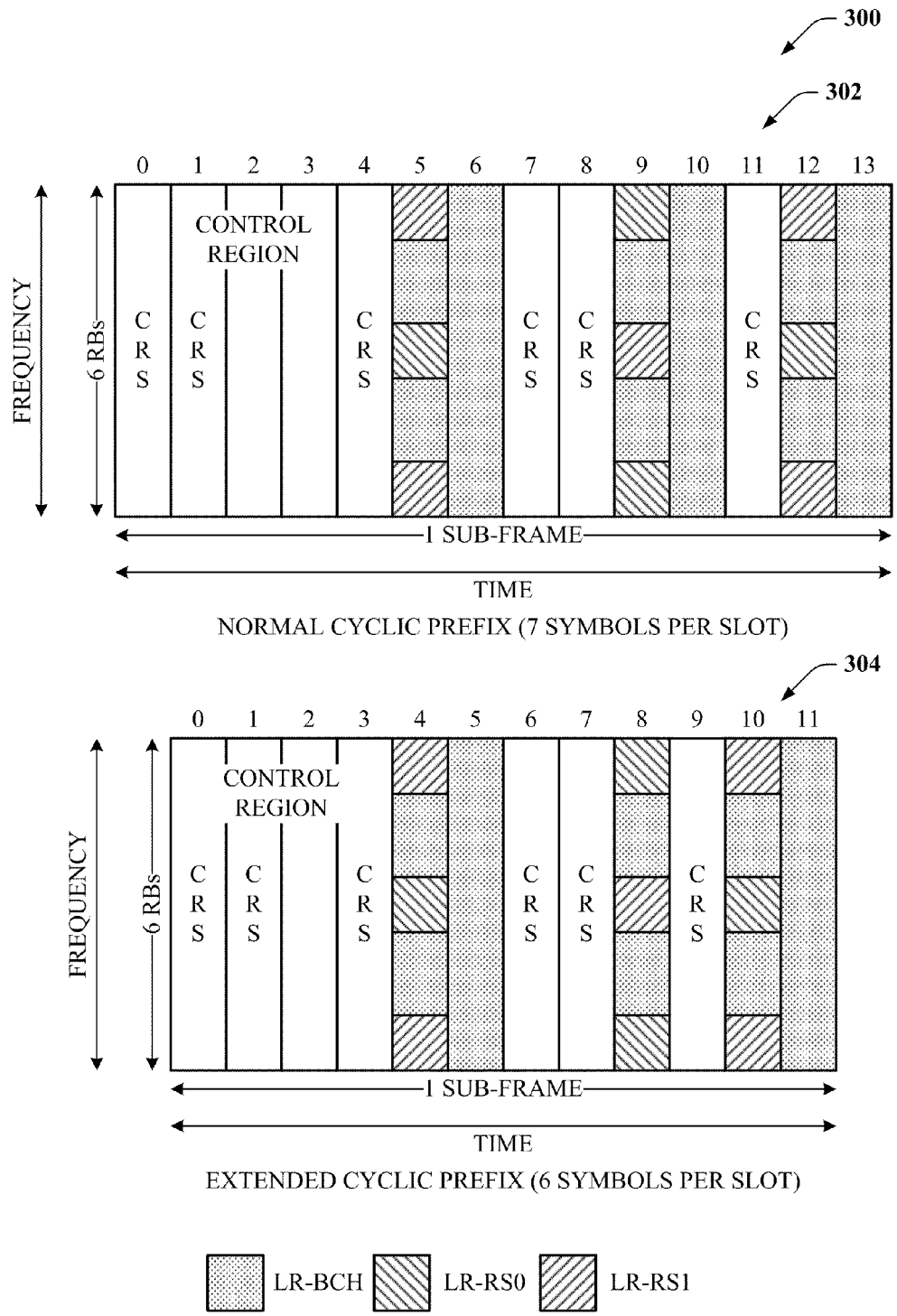
FIG. 3 is an illustration of an example resource diagram for a low reuse preamble in accordance with various aspects.

Referring now to FIG. 3, a resource diagram 300 is illustrated that depicts an example low reuse preamble. Resource diagram 300 depicts a low reuse preamble structure 302 that can be utilized with a normal cyclic prefix which includes 7 symbols per slot (14 per sub-frame) and a low reuse preamble structure 304 that can be employed with an extended cyclic prefix which includes 6 symbols per slot (12 per sub-frame). Accordingly to an example, structures 302 and 304 can span 6 resource blocks (RBs) in the frequency dimension and one sub-frame (two slots) in the time dimensions. It is to be appreciated that claimed subject matter is not limited to the example structures 302 and 304 illustrated in FIG. 3 as it is contemplated that alternative structures, with varying sizes in the frequency and/or time dimension, are intended to fall within the scope of the hereto appended claims.

In an aspect, structure 302 and 304 depict respective low reuse preambles, which do not include a synchronization signal (e.g., LR-SS). To avoid CRS and control signaling, the low reuse preamble can occupy symbols 5, 6, 9, 10, 12, and 13 of a sub-frame for normal cyclic prefix and symbols 4, 5, 8, 10, and 11 for extended cyclic prefix. In particular, LR-BCH can utilize symbols 5, 6, 9, 10, 12, and 13 (normal cyclic prefix) or symbols 4, 5, 8, 10, and 11 (extended cyclic prefix), and LR-RS can be incorporated into symbols 5, 9 and 12 for normal cyclic prefix or symbols 4, 8 and 10 for extended cyclic prefix.

Figure 4:
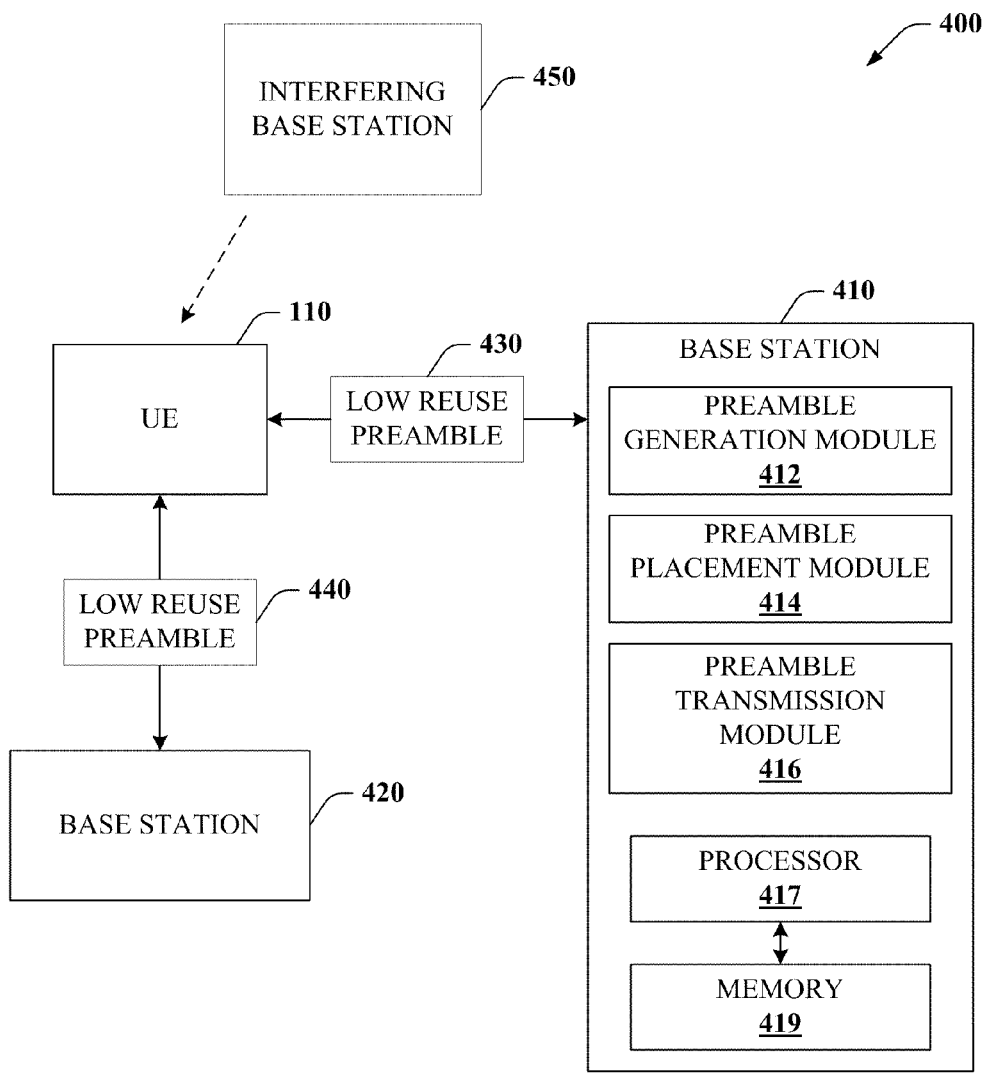
FIG. 4 is an illustration of an example system that facilitates generation and transmission of a low reuse preamble in accordance with various aspects.

Turning to FIG. 4, illustrated is a system 400 that facilitates generation and transmission of a low reuse preamble in accordance with various aspects. System 400 can include UE 110 as described with respect to previous figures. UE 110 can be located within respective coverage areas associated with at least two base stations, such as base station 410 and base station 420. Base stations 410 and 420 can respectively be associated with one of a variety of power classes. For instance, base stations 410 and 420 can individually be one of a macro base station associated with a macrocell, a femto base station associated with a femtocell, or a pico base station associated with a picocell.

UE 110 can be configured to communicate with base station 410 and/or base station 420 via downlink and uplink channels. In a single cell configuration, UE 110 can communicate with one of base station 410 or base station 420, which can be denoted as a serving base station. However, it is to be appreciated that UE 110 can be configured for multi-cell communication, such as a coordinate multipoint (CoMP) operation, whereby UE 110 communicates via uplink and downlink channels with both of base stations 410 and 420.

Before accessing base station 410 and/or 420, UE 110 undertakes a cell search procedure. The cell search procedure can be performed in connection with an initial synchronization or new cell identification. In an example, UE 110 performs an initial synchronization when UE 110 powers up or when UE 110 loses a connection to a serving cell. When already connected to a cell, UE 110 can perform cell search to identify a new neighbor cell, which can lead to a handover or a cell reselection.

In an aspect, UE 110 can attempt detection and/or acquisition of base stations 410 and/or 420, but experience high levels of interference from an interfering base station 450. According to an example, interfering base station 450 can be a femto base station associated with a femtocell, which is typically a low power access point in a communication network. Interfering base station 450 can include a corresponding closed subscriber group (CSG). A subscriber (e.g., UE 110) that is not a member of the CSG is not permitted to access interfering base station 450. Accordingly, signals transmitted by interfering base station 450 can inhibit an ability of UE 110 to receive signals from base stations 410 and 420. In some situations, the interference from interfering base station 450 can prevent detection and acquisition of base stations 410 or 420 during cell search.

To enable detection despite high interference, base stations 410 and 420 can respectively transmit low reuse preambles (LRPs) 430 and 440. LRPs 430 and 440 can include information such as, but not limited to, cell identities, cleared resources, bandwidth sizes, frame numbers, etc. In an aspect, UE 110 can receive and evaluate LRPs 430 and 440 to detect base stations 410 and 420 regardless of interference from interfering base station 450.

Figure 5:
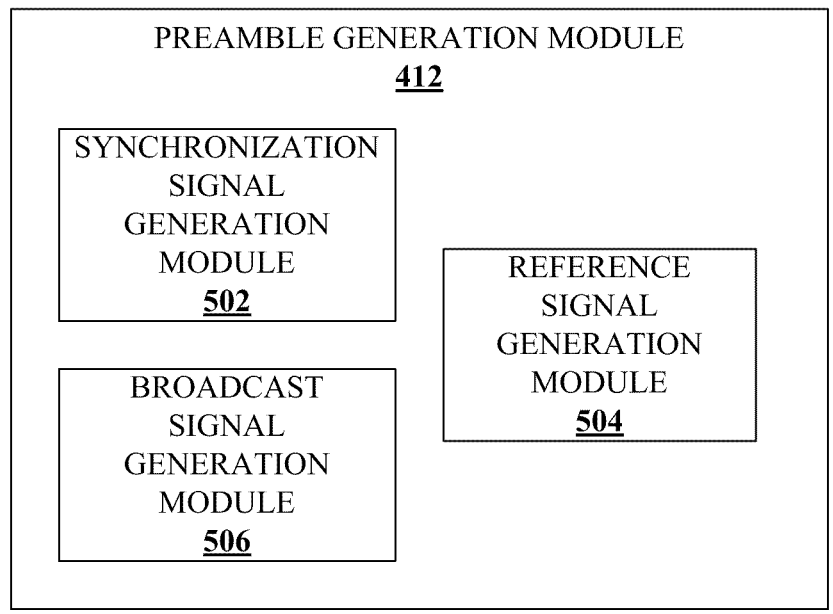
FIG. 5 is an illustration of an example system that facilitates generation of sub-channels of a low reuse preamble in accordance with various aspects.

Base station 410, in an aspect, can include a preamble generation module 412 that constructs low reuse preamble 430. Low reuse preamble 430 can include a set of sub-channel. The set of sub-channels can include a synchronization channel, a broadcast channel, and/or a pilot channel. Turning briefly to FIG. 5, a detailed preamble generation module 412 is illustrated in accordance with an aspect. Preamble generation module 412 can include synchronization signal generation module 502 that provides a synchronization signal to include in a synchronization signal sub-channel (e.g., LR-SS). The synchronization signal can convey a cell identity associated with base station 410. In an aspect, synchronization signal generation module 502 can utilize a length—63 Zadoff-Chu sequence, whose value is a partial cell identity. In another aspect, signal generation module 502 can interleave two length—31 M-sequences to generate a synchronization signal, which includes a partial cell identity. In another aspect, synchronization signal generation module 502 can employ both the length—63 Zadoff-Chu sequence and the two length—31 M-sequences to provide a complete cell identity. In another example, an optimized binary or Chu sequence can be employed. The optimized sequence can include cell identity information while providing enhanced cross-correlation properties. Further, synchronization signal generation module 502 can implement additional scrambling when the low reuse preamble is located in a central portion of system bandwidth.

Preamble generation module 412 can also include a reference signal generation module 504, which constructs a low reuse reference signal. In an aspect, reference signal generation module 504 can employ a sequence utilized for a common or cell-specific reference signal to generate the low reuse reference signal. For instance, the low reuse reference signal can be one of 504 distinct reference signal sequences, wherein each sequence corresponds to a particular cell identity.

In another aspect, preamble generation module 412 can include a broadcast signal generation module 506 that generates a payload to include on a low reuse broadcast channel. The payload can include system information such as information regarding system bandwidth, a cell identity (e.g., a physical-layer cell identity), system frame number, cleared resource, and/or other information which facilitates acquisition of base station 410. A cyclic redundancy check (CRC) can be inserted into the payload. In one example, the CRC can be based upon a sequence utilized for a low reuse synchronization signal. In another aspect, the CRC can include spatial diversity information (e.g., whether diversity is applied and/or what type). Broadcast signal generation module 506 can apply tail-biting convolutional coding on the payload with CRC attached; however, it is to be appreciated that other coding techniques (e.g., Turbo coding, convolutional coding, etc.) can be applied and are intended to fall within the scope of the hereto appended claims. After coding, broadcast signal generation module 506 can modulate the encoded block. In one example, quadrature phase shift keying (QPSK) can be utilized.

Returning to FIG. 4, base station 410 can also include a preamble placement module 414 that maps low reuse preamble 430 onto downlink resources. In one example, preamble placement module 414 can utilize a resource structure, such as structure 202, 204, 302, or 304 described above, or another suitable structure to place the set of sub-channels of low reuse preamble 430. In particular, preamble placement module 414 can incorporate low reuse preamble 430 into a downlink traffic channel (e.g., physical downlink shared channel (PDSCH)) portion of a sub-frame. By incorporating low reuse preamble 430 in PDSCH, the preamble becomes transparent to legacy UEs as the resource utilized by the preamble will be ignored.

In an aspect, preamble placement module 414 can select a 6 resource block strip within a sub-frame to locate low reuse preamble 430. Further, preamble placement module 414 can select any sub-frame to transmit low reuse preamble; however, in one example, sub-frames 0 and 5 can be reserved in a small bandwidth system (e.g., a six resource block bandwidth).

According to another aspect, base station 410 can include a preamble transmission module 416 that determines when to transmit low reuse preamble 430. Preamble transmission module 416 can base transmission decisions on a transmission period. The transmission period can be pre-configured by an operator of system 400. In another example, preamble transmission module 416 can dynamically configure the transmission period based upon interference measurements (e.g., channel estimates, channel quality indicator reports, etc.), system loading, and the like. The transmission period can be relatively large (e.g., 100 milliseconds); however, it is to be appreciated that the claimed subject matter is not limited to this transmission period as it is contemplated that other periods can be configured and are intended to fall within the scope of the hereto appended claims (e.g., 50, milliseconds, 100 milliseconds, 150 milliseconds, 200 milliseconds, etc.). In another example, preamble transmission module 416, upon reaching a low reuse preamble transmission opportunity as indicated by the transmission period, can determine whether low reuse preamble 430 should be transmitted during the opportunity. For instance, preamble transmission module 416 can utilize a pseudo-random number generator to select whether or not to transmit.

As further illustrated in system 400, base station 410 can include a processor 417 and/or a memory 419, which can be utilized to implement some or all the functionality of preamble generation module 412, preamble placement module 414, preamble transmission module 416, and/or other functionality of base station 410.

Figure 6:
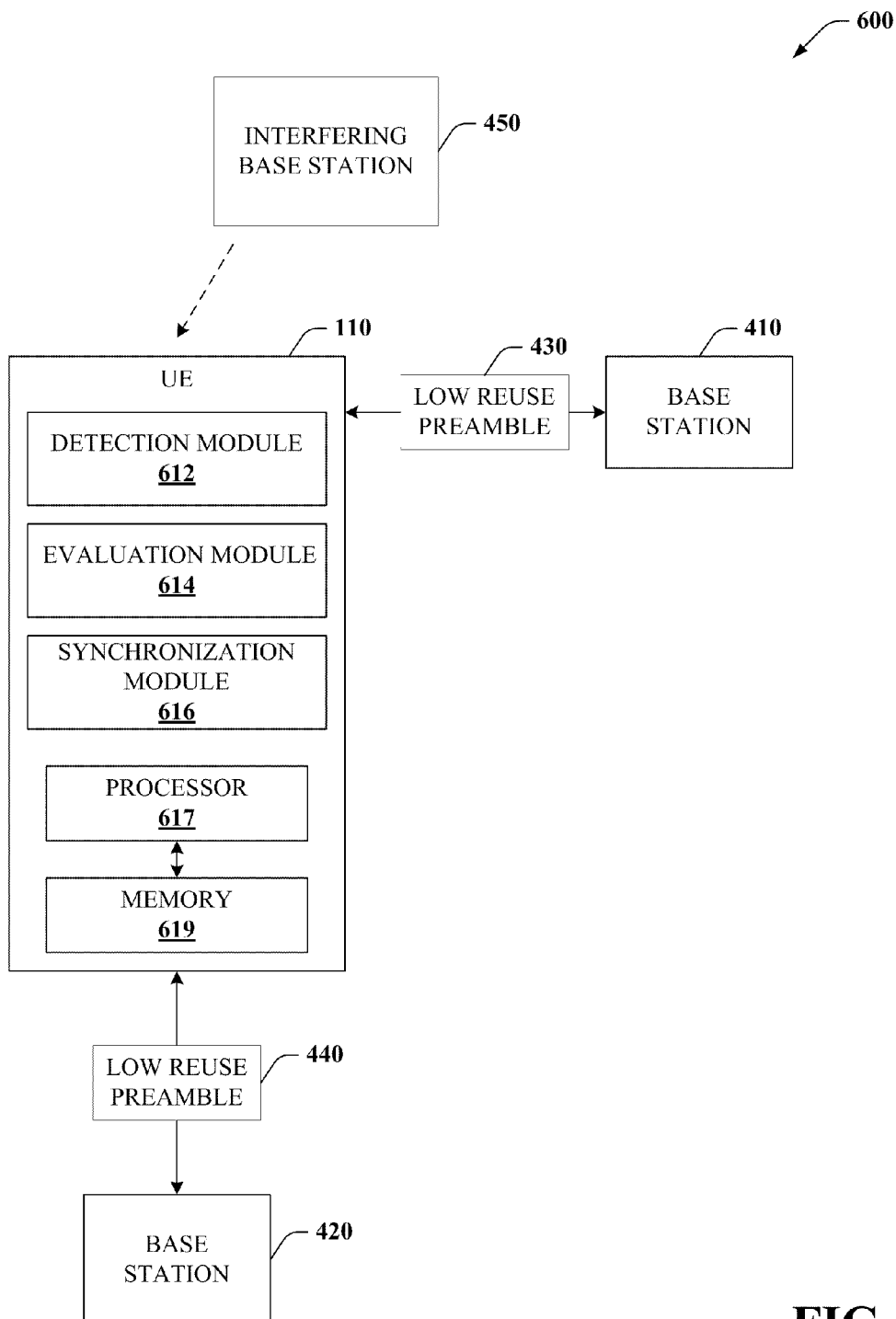
FIG. 6 is an illustration of an example system that facilitates detection of a base station via a low reuse preamble in accordance with various aspects.

FIG. 6 depicts a system 600 that facilitates detection of a base station via a low reuse preamble in accordance with various aspects. System 600 can include UE 110, base station 410, base station 420, and interfering base station 450, which can be substantially similar to and perform similar functionality as similarly numbered components described above with reference to previous figures. In an aspect, UE 110 can detect base stations 410 and/or 420 via low reuse preambles 430 and 440, respectively. UE 110 can discover base stations 410 and/or 420 while experience high levels of interference due to interfering base station 450 (e.g., a femtocell or other inaccessible cell).

UE 110 can include a detection module 612, an evaluation module 614, and/or a synchronization module 616. Detection module 612 can monitor a traffic channel (e.g., a portion of a sub-frame associated with user data) to detect low reuse preambles, such as preambles 430 and 440 associated with base stations 410 and 420. In an example, UE 110 can employ synchronization module 616 to synchronize with a network associated with base stations 410, 420, and 450. For instance, the network can be a synchronized network. Accordingly, synchronization module 616 can utilize interfering signals transmitted by base station 450 to acquire frame and/or slot timing. Such timing synchronization can facilitate identification of a traffic channel portion of sub-frames which include low reuse preambles 430 and 440.

Evaluation module 614 can demodulate and decode a detected low reuse preamble to obtain information about a cell. In an aspect, evaluation module 614 can analyze LR-SS (a synchronization signal in the low reuse preamble) to identify a sequence encoded therein. Evaluation module 614 can utilize the sequence to descramble LR-BCH and LR-RS, as well as identify RS symbols positions. LR-RS can facilitate coherent demodulation and decode of LR-BCH, which contains system information to facilitate acquisition of the cell.

As further illustrated in system 600, UE 110 can include a processor 617 and/or a memory 619, which can be utilized to implement some or all the functionality of detection module 612, evaluation module 614, synchronization module 616, and/or other functionality of UE 110.

Figure 7:
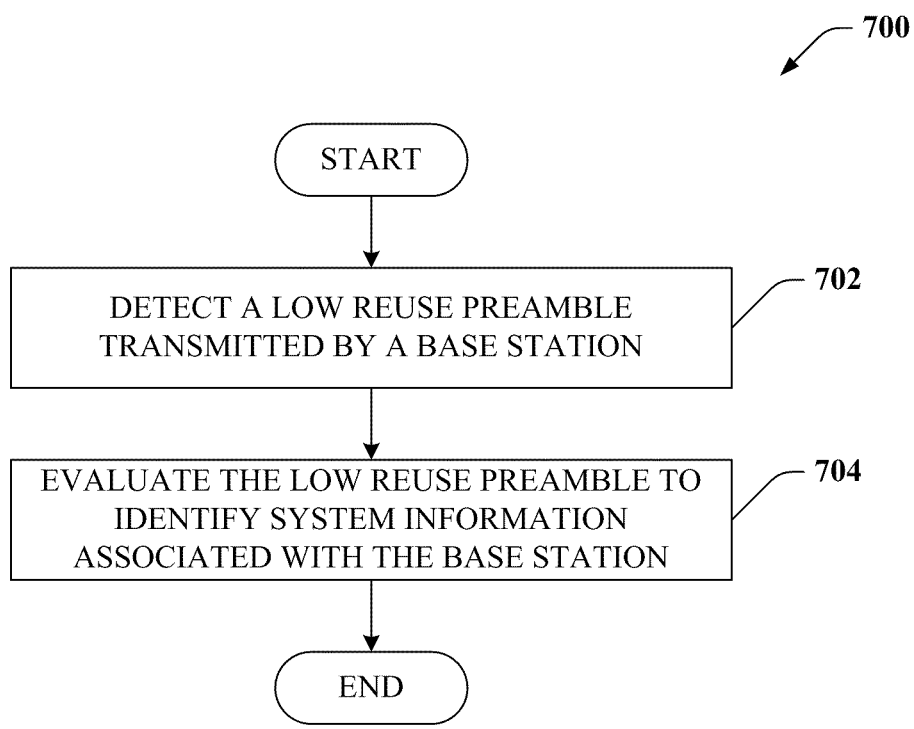
FIG. 7 is an illustration of an example methodology for detecting base stations in high-interference environments.
Figure 8:
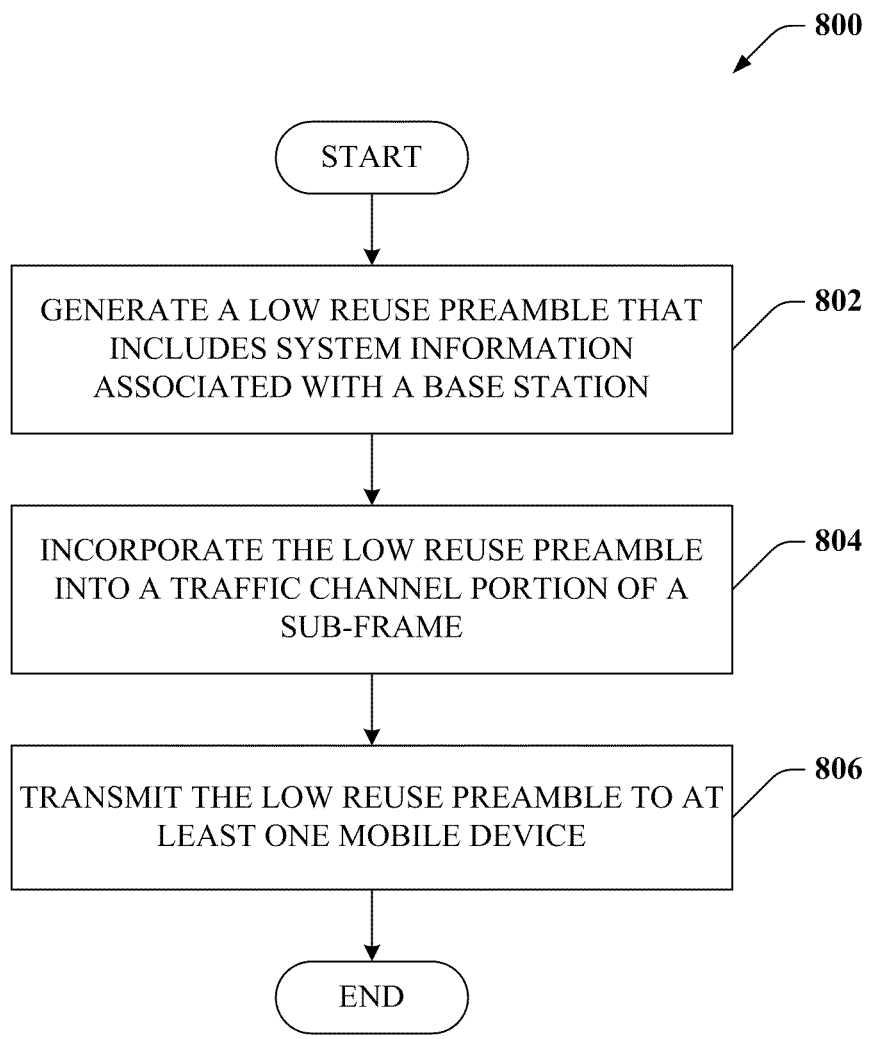
FIG. 8 is an illustration of an example methodology for employing a low reuse preamble to facilitate cell search in high-interference environments in accordance with various aspects.

Referring to FIGS. 7-8, methodologies are described related to facilitating detection of cells via low reuse preambles transmitted, at low power, periodically by base stations. The methodologies can be implemented by systems 100, 400, 500 and/or 600, described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is a method 700 for detecting base stations in high-interference environments. Method 700 can be employed, for example, by a user equipment (e.g., UE 110) to acquire a cell despite high levels of interference. At reference numeral 702, a low reuse preamble, transmitted by a base station, is detected. In an example, a traffic channel (e.g., a physical downlink shared channel) can be monitored to detect the low reuse preamble. Monitoring the traffic channel can be facilitated by synchronizing with a network associated with the base station via an interfering base station. After synchronization a traffic channel portion of a sub-frame can be identified.

In another aspect, the low reuse preamble can include a synchronization signal, a broadcast channel, and/or a reference signal. Detecting the low reuse preamble can be effectuated by identifying (e.g, detecting) the synchronization signal of the low reuse preamble. At reference numeral 704, the low reuse preamble is evaluated to identity system information associated with the base station. In an aspect, the system information can include at least one of cell identity information, system bandwidth information, a system frame number, hybrid automatic repeat request channel configuration information, random access information, operator information, and/or restriction information. In one example, the system information can be obtained by decoding the broadcast channel included in the low reuse preamble.

Referring now to FIG. 8, a method 800 for employing a low reuse preamble to facilitate cell search in high-interference environments is illustrated. Method 800 can be employed, for example, by a base station (e.g., eNB 120, base station 410, base station 420, etc.) to enable UEs to detect the base station. At reference numeral 802, a low reuse preamble is generated. In an aspect, the low reuse preamble can include system information associated with a base station. The low reuse preamble can include a synchronization signal, a broadcast channel, or a reference signal. In one example, the synchronization signal can include a Zadoff-Chu sequence. In another example, a binary sequence can be utilized. In addition, a sequence utilized for the synchronization signal can be optimized to provide enhanced cross-correlation properties. When generating the broadcast channel and/or the reference signal, the sequence employed for the synchronization signal can be utilized to scramble the broadcast channel and/or the reference signal. The reference signal can be generated based upon a common reference signal structure employed for cell-specific reference signals on a downlink. Further, generating the broadcast channel can include encoding the system information on the broadcast channel. To encode the system information, convolutional coding and/or QPSK modulation can be employed. However, it is to be appreciated that other coding and/or modulation techniques can be utilized for the broadcast channel.

At reference numeral 804, the low reuse preamble can be incorporated into a traffic channel in a sub-frame. In an example, the low reuse preamble can be incorporated by avoiding symbols of the sub-frame that carry control signaling and common reference signals. For instance, control signaling symbols and common reference signal symbols can be identified in a sub-frame. Those symbols can be avoided by placing the low reuse preamble in the sub-frame in a non-overlapping manner. At reference numeral 806, the low reuse preamble is transmitted to at least one mobile device.

It will be appreciated that, in accordance with one or more aspects described herein, inferences can be made regarding detecting a low reuse preamble, configuring a transmission period of the low reuse preamble, evaluating the low reuse preamble, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
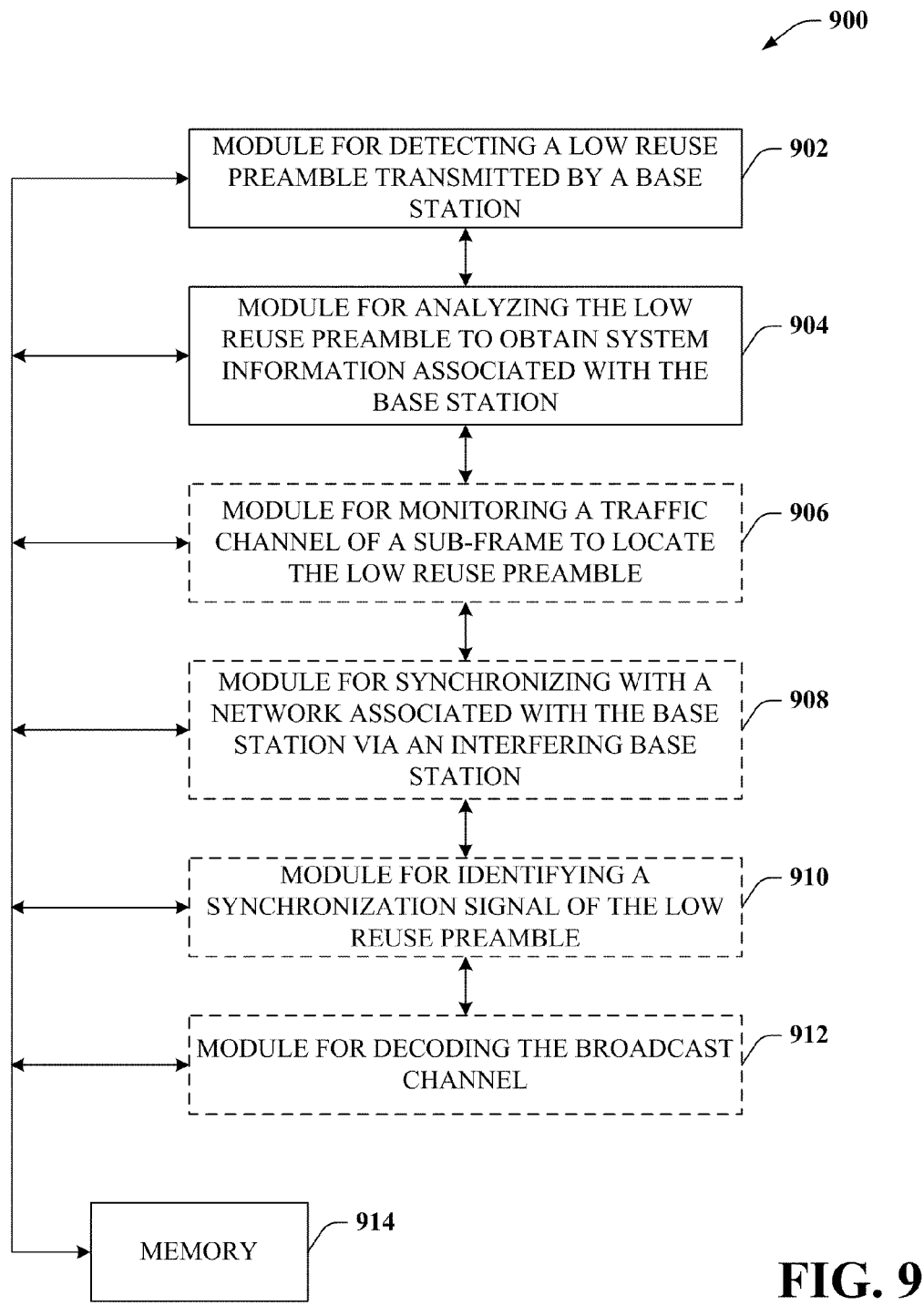
FIG. 9 is an illustration of an example apparatus that facilitates detecting base stations in high-interference environments in accordance with various aspects.

Referring next to FIG. 9, an apparatus 900 that facilitates detecting base stations in high-interference environments is illustrated. It is to be appreciated that apparatus 900 is represented as including functional blocks, which can be functional blocks that represent functions implemented by a processor, software, or combination thereof (e.g., firmware). Apparatus 900 can be implemented by a mobile device (e.g., UE 110) and/or any other suitable network entity. Apparatus 900 can include a module 902 for detecting a low reuse preamble transmitted by a base station, and a module 904 for analyzing the low reuse preamble to obtain system information associated with the base station. Further, apparatus 900 can include an optional module 906 for monitoring a traffic channel of a sub-frame to locate the low reuse preamble, an optional module 908 for synchronizing with a network associated with the base station via an interfering base station, an optional module 910 for identifying a synchronization signal of the low reuse preamble, and an optional module 912 for decoding the broadcast channel. Additionally, apparatus 900 can include a memory 914 that retains instructions for executing functions associated with modules 902-912.

Figure 10:
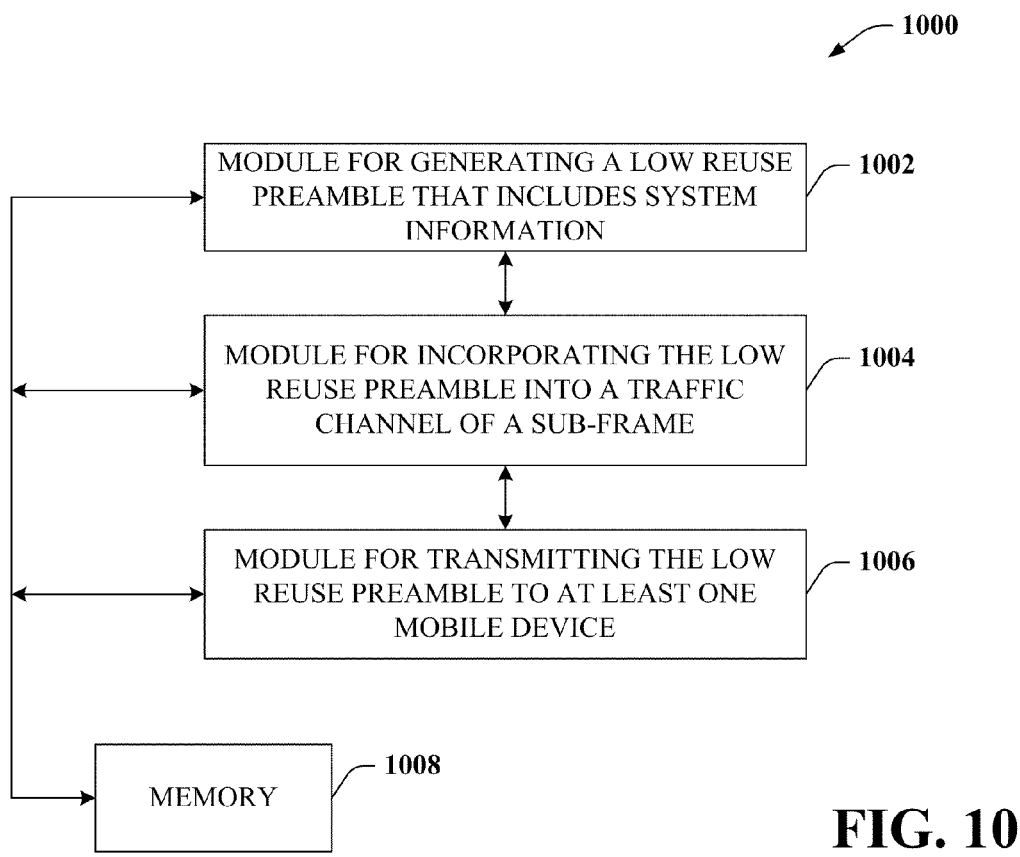
FIG. 10 is an illustration of an example apparatus that facilitates cell search in high-interference environments in accordance with various aspects.

Turning to FIG. 10, an apparatus 1000 that facilitates cell search in high-interference environments is illustrated. It is to be appreciated that apparatus 1000 is represented as including functional blocks, which can be functional blocks that represent functions implemented by a processor, software, or combination thereof (e.g., firmware). Apparatus 1000 can be implemented by a base station (e.g., eNB 120, base station 410, etc.) and/or any other suitable network entity. Apparatus 1100 can include a module 1002 for generating a low reuse preamble that includes system information, a module 1004 for incorporating the low reuse preamble into a traffic channel of a sub-frame, and a module 1006 for transmitting the low reuse preamble to at least one mobile device. Additionally, apparatus 1000 can include a memory 1008 that retains instructions for executing functions associated with modules 1002-1006.

Figure 11:
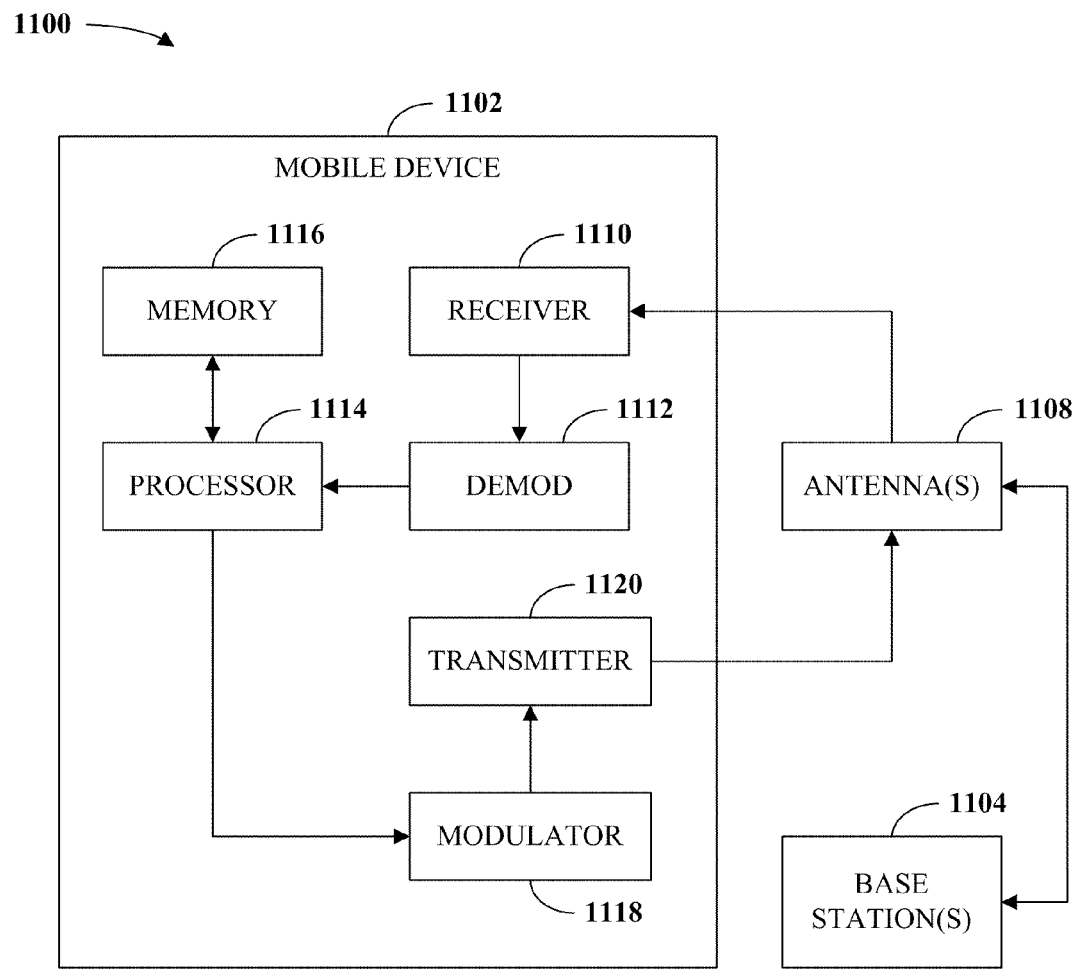
FIGS. 11-12 are block diagrams of respective wireless communication devices that can be utilized to implement various aspects of the functionality described herein.

FIG. 11 is a block diagram of another system 1100 that can be utilized to implement various aspects of the functionality described herein. In one example, system 1100 includes a mobile device 1102. As illustrated, mobile device 1102 can receive signal(s) from one or more base stations 1104 and transmit to the one or more base stations 1104 via one or more antennas 1108. Additionally, mobile device 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile device 1102. Mobile device 1102 can also include a modulator 1118 that can multiplex a signal for transmission by a transmitter 1120 through antenna(s) 1108.

Figure 12:
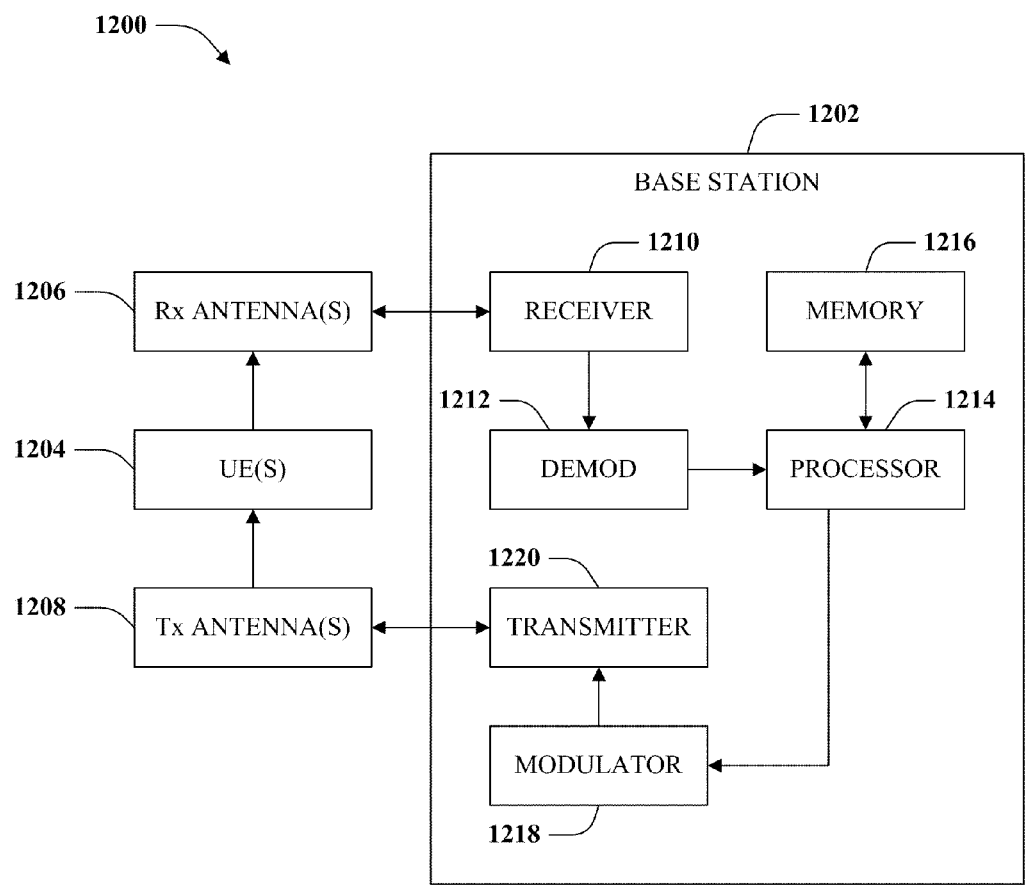

FIG. 12 is a block diagram of a system 1200 that can be utilized to implement various aspects of the functionality described herein. In one example, system 1200 includes a base station 1202. As illustrated, base station 1202 can receive signal(s) from one or more UEs 1204 via one or more receive (Rx) antennas 1206 and transmit to the one or more UEs 1204 via one or more transmit (Tx) antennas 1208. Additionally, base station 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Base station 1202 can also include a modulator 1218 that can multiplex a signal for transmission by a transmitter 1220 through transmit antenna(s) 1208.

Figure 13:
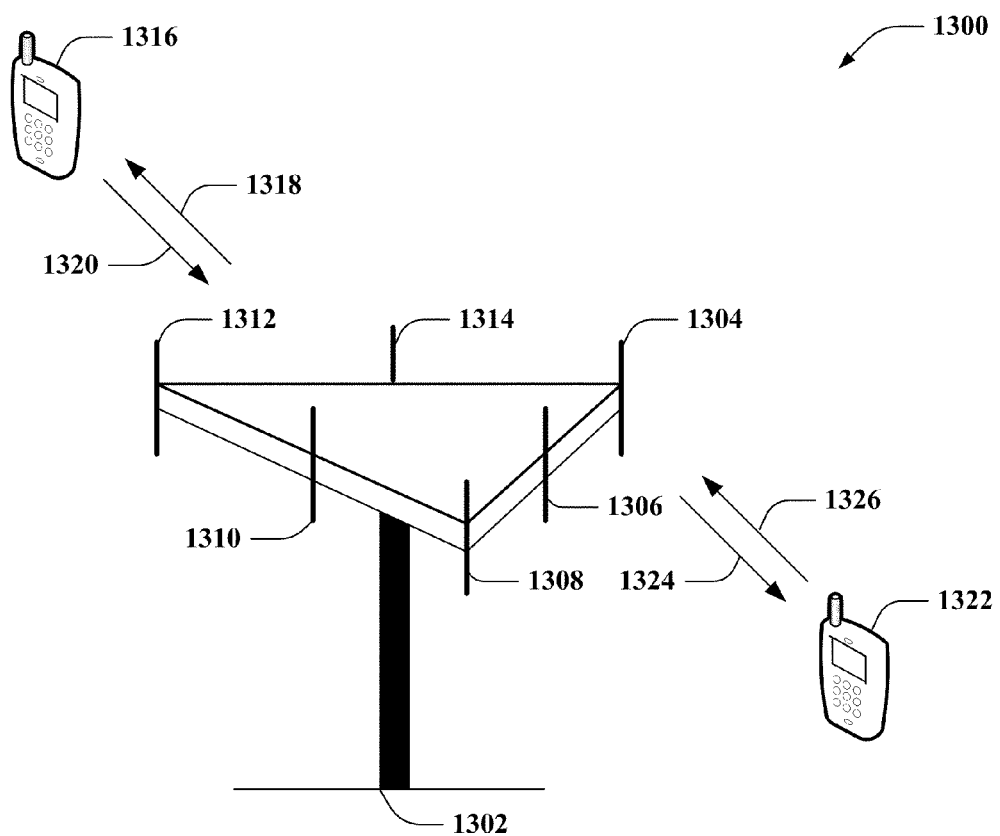
FIG. 13 is an illustration of a wireless communication system in accordance with various aspects set forth herein.

Referring now to FIG. 13, a wireless communication system 1300 is illustrated in accordance with various embodiments presented herein. System 1300 comprises a base station (e.g., access point) 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1302 can communicate with one or more UEs such as UE 1316 and UE 1322; however, it is to be appreciated that base station 1302 can communicate with substantially any number of UEs similar to UEs 1316 and 1322. UEs 1316 and 1322 can be, for example, cellular phones, smart phones, laptops, handheld communication devices, handheld computing devices, satellite radios, global positioning systems, PDAs, and/or any other suitable device for communicating over wireless communication system 1300. As depicted, UE 1316 is in communication with antennas 1312 and 1314, where antennas 1312 and 1314 transmit information to UE 1316 over a downlink 1318 and receive information from UE 1316 over an uplink 1320. Moreover, UE 1322 is in communication with antennas 1304 and 1306, where antennas 1304 and 1306 transmit information to UE 1322 over a downlink 1324 and receive information from UE 1322 over an uplink 1326. In a frequency division duplex (FDD) system, downlink 1318 can utilize a different frequency band than that used by uplink 1320, and downlink 1324 can employ a different frequency band than that employed by uplink 1326, for example. Further, in a time division duplex (TDD) system, downlink 1318 and uplink 1320 can utilize a common frequency band and downlink 1324 and uplink 1326 can utilize a common frequency band.

Each group of antennas and/or the area in which they are designated to communicate can be referred to as a sector of base station 1302. For example, antenna groups can be designed to communicate to UEs in a sector of the areas covered by base station 1302. In communication over downlinks 1318 and 1324, the transmitting antennas of base station 1302 can utilize beamforming to improve signal-to-noise ratio of downlinks 1318 and 1324 for UEs 1316 and 1322. Also, while base station 1302 utilizes beamforming to transmit to UEs 1316 and 1322 scattered randomly through an associated coverage, UEs in neighboring cells can be subject to less interference as compared to a base station transmitting through a single antenna to all its UEs. Moreover, UEs 1316 and 1322 can communicate directly with one another using a peer-to-peer or ad hoc technology (not shown).

According to an example, system 1300 can be a multiple-input multiple-output (MIMO) communication system. Further, system 1300 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1302 can communicate to the UEs 1316 and 1322 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
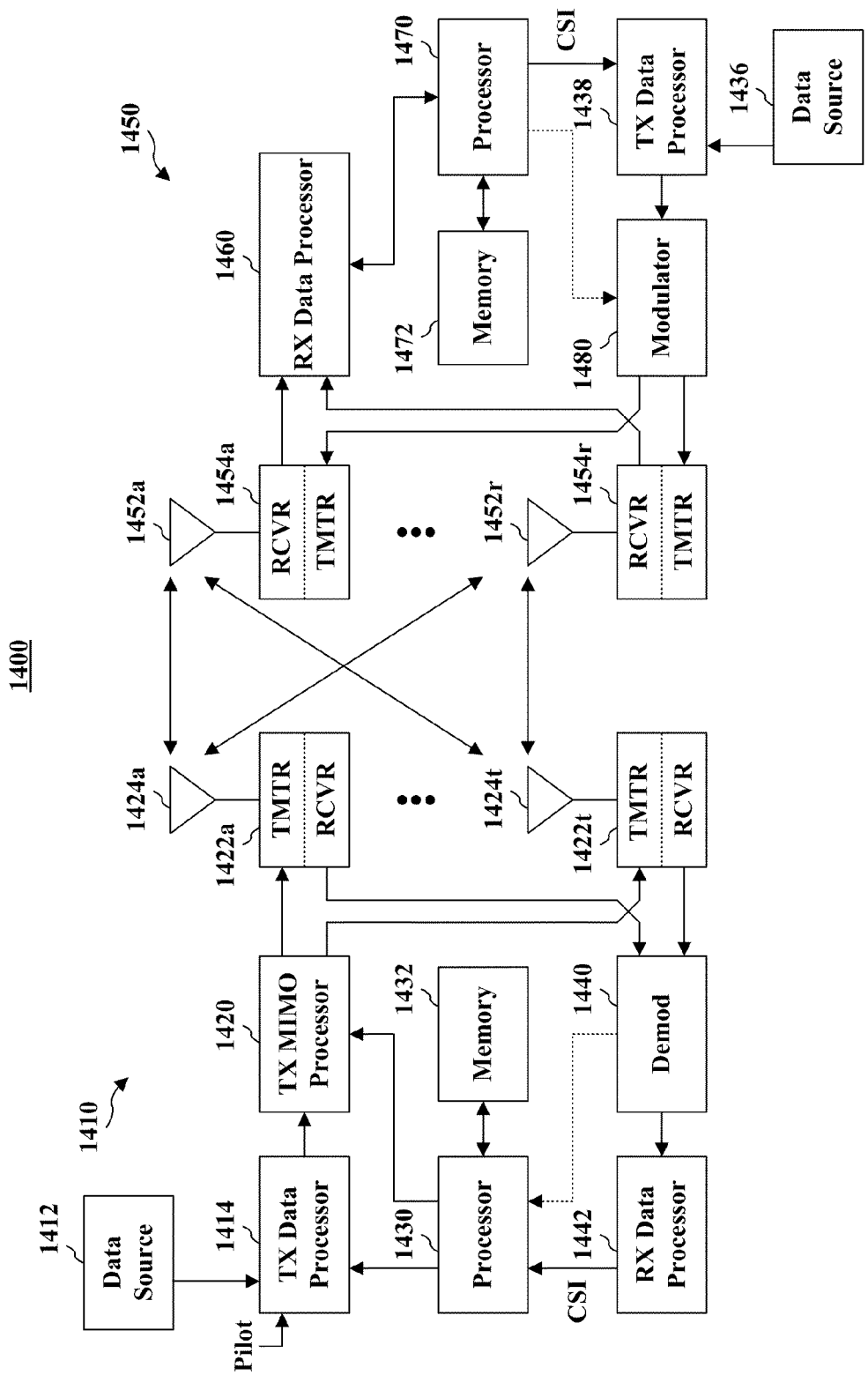
FIG. 14 is a block diagram illustrating an example wireless communication system in which various aspects described herein can function.

FIG. 14 shows an example wireless communication system 1400. The wireless communication system 1400 depicts one base station 1410 and one access terminal 1450 for sake of brevity. However, it is to be appreciated that system 1400 can include more than one base station and/or more than one access terminal, wherein additional base stations and/or access terminals can be substantially similar or different from example base station 1410 and access terminal 1450 described below. In addition, it is to be appreciated that base station 1410 and/or access terminal 1450 can employ the systems (FIGS. 1, 4, 5, 6, and 9-10) and/or method (FIGS. 7-8) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At access terminal 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which available technology to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from access terminal 1450 are received by antennas 1424, conditioned by receivers 1422, demodulated by a demodulator 1440, and processed by a RX data processor 1442 to extract the reverse link message transmitted by access terminal 1450. Further, processor 1430 can process the extracted message to determine which precoding matrix to use for determining the beamforming weights.

Processors 1430 and 1470 can direct (e.g., control, coordinate, manage, etc.) operation at base station 1410 and access terminal 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ... ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    detecting a low reuse preamble transmitted by a base station, wherein the low reuse preamble includes a synchronization signal, wherein the synchronization signal is optimized to provide enhanced cross-correlation properties; and
    evaluating the low reuse preamble to identify system information associated with the base station.

2. The method of claim 1, further comprising monitoring a traffic channel of a sub-frame to locate the low reuse preamble.

3. The method of claim 2, wherein the traffic channel is a physical downlink shared channel.

4. The method of claim 1, further comprising synchronizing with a network associated with the base station via an interfering base station.

5. The method of claim 4, further comprising identifying a traffic channel portion of a sub-frame.

6. The method of claim 4, wherein the interfering base station is associated with a femtocell.

7. The method of claim 1, wherein detecting the low reuse preamble comprises identifying the synchronization signal.

8. The method of claim 1, wherein the low use preamble comprises a broadcast channel and wherein evaluating the low reuse preamble comprises decoding the broadcast channel to obtain the system information.

9. The method of claim 1, wherein the system information includes at least one of cell identity information, system bandwidth information, a system frame number, hybrid automatic repeat request channel configuration information, random access information, operator information, or restriction information.

10. A wireless communications apparatus, comprising:
a memory that retains instructions related to:
identifying a low reuse preamble transmitted by a base station, wherein the low reuse preamble includes a synchronization signal, wherein the synchronization signal is optimized to provide enhanced cross-correlation properties; and
evaluating the low reuse preamble to identify system information associated with the base station; and
a processor, coupled to the memory, configured to execute the instructions retained in the memory.

11. The wireless communications apparatus of claim 10, wherein the memory further retains instructions related to monitoring a traffic channel of a sub-frame to locate the low reuse preamble.

12. The wireless communications apparatus of claim 10, wherein the memory further retains instructions related to synchronizing with a network associated with the base station via an interfering base station.

13. The wireless communications apparatus of claim 10, wherein the memory further retains instructions related to identifying the synchronization signal.

14. The wireless communications apparatus of claim 10, wherein the low use preamble comprises a broadcast channel and wherein the memory further retains instructions related to decoding the broadcast channel to obtain the system information.

15. The apparatus of claim 10, wherein the system information includes at least one of cell identity information, system bandwidth information, a system frame number, hybrid automatic repeat request channel configuration information, random access information, operator information, or restriction information.

16. An apparatus that enables detection of a base station in high-interference environments, comprising:
means for detecting a low reuse preamble transmitted by the base station, wherein the low reuse preamble includes a synchronization signal, wherein the synchronization signal is optimized to provide enhanced cross-correlation properties; and
means for analyzing the low reuse preamble to obtain system information associated with the base station.

17. The apparatus of claim 16, further comprising means for monitoring a traffic channel of a sub-frame to locate the low reuse preamble.

18. The apparatus of claim 16, further comprising means for synchronizing with a network associated with the base station via an interfering base station.

19. The apparatus of claim 16, further comprising means for identifying the synchronization signal.

20. The apparatus of claim 16, wherein the low use preamble comprises a broadcast channel and further comprising means for decoding the broadcast channel to obtain the system information.

21. The apparatus of claim 16, wherein the system information includes at least one of cell identity information, system bandwidth information, a system frame number, hybrid automatic repeat request channel configuration information, random access information, operator information, or restriction information.

22. A computer program product, comprising:
a non-transitory computer-readable medium, comprising:
code for causing at least one computer to detect a low reuse preamble transmitted by a base station, wherein the low reuse preamble includes a synchronization signal, wherein the synchronization signal is optimized to provide enhanced cross-correlation properties; and
code for causing the at least one computer to evaluate the low reuse preamble to identify system information associated with the base station.

23. The computer program product of claim 22, wherein the computer-readable medium further comprises code for causing the at least one computer to monitor a traffic channel of a sub-frame to locate the low reuse preamble.

24. The computer program product of claim 22, wherein the computer-readable medium further comprises code for causing the at least one computer to synchronize with a network associated with the base station via an interfering base station.

25. The computer program product of claim 24, wherein the computer-readable medium further comprises code for causing the at least one computer to identify a traffic channel portion of a sub-frame.

26. The computer program product of claim 22, wherein the computer-readable medium further comprises code for causing the at least one computer to identify the synchronization signal.

27. The computer program product of claim 22, wherein the computer-readable medium further comprises code for causing the at least one computer to decode the broadcast channel to obtain the system information.

28. The computer program product of claim 22, wherein the system information includes at least one of cell identity information, system bandwidth information, a system frame number, hybrid automatic repeat request channel configuration information, random access information, operator information, or restriction information.

29. A wireless communications apparatus, comprising:
a processor configured to:
identify a low reuse preamble transmitted by a base station, wherein the low reuse preamble includes a synchronization signal, wherein the synchronization signal is optimized to provide enhanced cross-correlation properties; and
evaluate the low reuse preamble to identify system information associated with the base station.

30. A method, comprising:
generating a low reuse preamble that includes system information associated with a base station, wherein the low reuse preamble includes a synchronization signal, wherein the synchronization signal is optimized to provide enhanced cross-correlation properties; and
transmitting the low reuse preamble to at least one mobile device.

31. The method of claim 30, wherein the synchronization signal is a binary sequence.

32. The method of claim 30, wherein the low use preamble comprises a broadcast channel and further comprising scrambling the broadcast channel with a sequence comprising the synchronization signal.

33. The method of claim 30, wherein the low use preamble comprises a broadcast channel and further comprising scrambling the reference signal with a sequence comprising the synchronization signal.

34. The method of claim 30, wherein the low use preamble comprises a broadcast channel and further comprising encoding the system information on the broadcast channel.

35. The method of claim 30, further comprising employing a common reference signal structure for the reference signal.

36. The method of claim 30, further comprising incorporating the low reuse preamble into a traffic channel portion of a sub-frame, wherein incorporating the low reuse preamble into the traffic channel portion comprises avoiding symbols of the sub-frame that carry control signaling and common reference signals.

37. A method, comprising:
generating a low reuse preamble that includes system information associated with a base station, wherein the low reuse preamble includes a synchronization signal, wherein the synchronization signal is a Zadoff-Chu sequence; and
transmitting the low reuse preamble to at least one mobile device.

38. A wireless communications apparatus, comprising:
a memory that retains instructions related to:
generating a low reuse preamble that includes system information associated with a base station, wherein the low reuse preamble includes a synchronization signal, wherein the synchronization signal is optimized to provide enhanced cross-correlation properties; and
transmitting the low reuse preamble to at least one mobile device; and
a processor, coupled to the memory, configured to execute the instructions retained in the memory.

39. The wireless communications apparatus of claim 38, wherein the low use preamble comprises a broadcast channel and wherein the memory further retains instructions related to scrambling the broadcast channel with a sequence comprising the synchronization signal.

40. The wireless communications apparatus of claim 38, wherein the low use preamble comprises a reference signal and wherein the memory further retains instructions related to scrambling the reference signal with a sequence comprising the synchronization signal.

41. The wireless communications apparatus of claim 38, wherein the low use preamble comprises a broadcast channel and wherein the memory further retains instructions related to encoding the system information on the broadcast channel.

42. The wireless communications apparatus of claim 38, wherein the memory further retains instructions related to employing a common reference signal structure to generate the reference signal.

43. The wireless communications apparatus of claim 38, wherein the memory further retains instructions related to incorporating the low reuse preamble into a traffic channel portion of a sub-frame, identifying control signaling and common reference signal symbols in the sub-frame, and placing the low reuse preamble in a non-overlapping manner relative to the control signaling and common reference signal symbols.

44. An apparatus, comprising:
means for generating a low reuse preamble that includes system information associated with a base station, wherein the low reuse preamble includes a synchronization signal, wherein the synchronization signal is optimized to provide enhanced cross-correlation properties; and
means for transmitting the low reuse preamble to at least one mobile device.

45. The apparatus of claim 44, wherein the low use preamble comprises a broadcast channel and a reference signal and further comprising means for scrambling at least one of the broadcast channel or reference signal with a sequence included in the synchronization signal.

46. The apparatus of claim 44, wherein the low use preamble comprises a broadcast channel and further comprising means for encoding the system information on the broadcast channel.

47. The apparatus of claim 44, further comprising:
means for incorporating the low reuse preamble into a traffic channel portion of a sub-frame;
means for identifying control signaling and common reference signal symbols in the sub-frame; and
means for placing the low reuse preamble in a non-overlapping manner relative to control signaling and common reference signal symbols.

48. A computer program product, comprising:
a non-transitory computer-readable medium, comprising:
code for causing at least one computer to generate a low reuse preamble that includes system information associated with a base station, wherein the low reuse preamble includes a synchronization signal, wherein the synchronization signal is optimized to provide enhanced cross-correlation properties; and
code for causing the at least one computer to transmit the low reuse preamble to at least one mobile device.

49. The computer program product of claim 48, wherein the computer-readable medium further comprises:
code for causing the at least one computer to identify control signaling and common reference signal symbols in a sub-frame;
code for causing the at least one computer to incorporate the low reuse preamble into a traffic channel of the sub-frame in a non-overlapping manner relative to the control signaling and common reference signal symbols; and
code for causing the at least one computer to encode the system information on the broadcast channel.

50. A wireless communications apparatus, comprising:
a processor configured to:
generate a low reuse preamble that includes system information associated with a base station, wherein the low reuse preamble includes a synchronization signal, wherein the synchronization signal is optimized to provide enhanced cross-correlation properties; and
transmit the low reuse preamble to at least one mobile device.

51. The wireless communications apparatus of claim 50, wherein the processor is further configured to:
identify control signaling and common reference signal symbols in a sub-frame;
incorporate the low reuse preamble into a traffic channel of the sub-frame in a non-overlapping manner relative to the control signaling and common reference signal symbols; and
encode the system information on the broadcast channel.

* * * * *